United States Patent

[11] 3,621,270

[72] Inventor Masahiko Akamatsu
Hyogo Prefecture, Japan
[21] Appl. No. 839,509
[22] Filed July 7, 1969
[45] Patented Nov. 16, 1971
[73] Assignee Mitsubishi Denki Kabushiki Kaisha
Tokyo, Japan
[32] Priority July 8, 1968
[33] Japan
[31] 43/47649

[54] SYSTEM FOR CONTROLLING DC POWER
3 Claims, 34 Drawing Figs.

[52] U.S. Cl. .......... 307/24, 307/20
[51] Int. Cl. .......... H02j 1/10
[50] Field of Search .......... 307/18, 19, 31, 32, 37, 33

[56] References Cited
UNITED STATES PATENTS
3,452,211 6/1969 Buerkel .......... 307/24

*Primary Examiner*—Herman J. Hohauser
*Attorneys*—Robert E. Burns and Emmanuel J. Lobato

ABSTRACT: A DC source is connected across two serially connected capacitors and across two DC power control units serially connected to each other with the junction of the capacitors connected to that of the controls. Each control unit may include a series combination of a thyristor and a diode with their junction connected to a load. The two loads can be connected together to the junction of the control units or respectively to both sides of the DC source.

PRIOR ART FIG. 1a
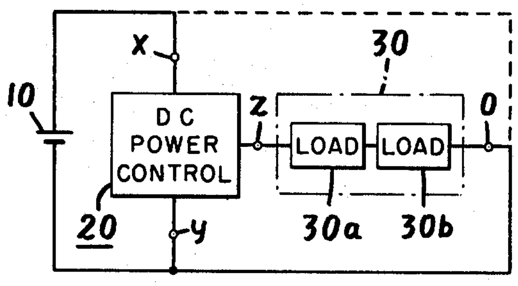
PRIOR ART FIG. 1b
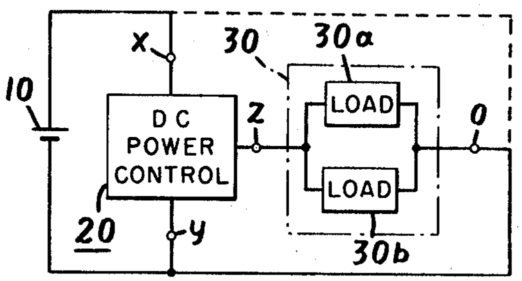
FIG. 2a
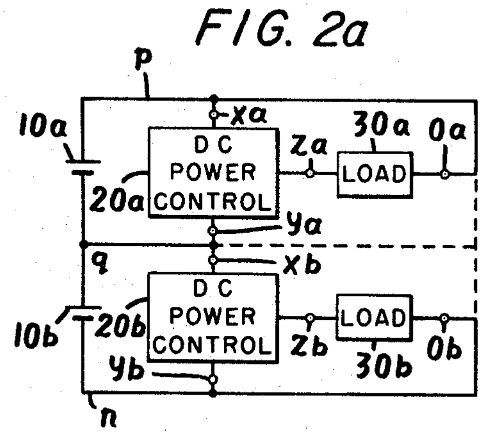
FIG. 2b
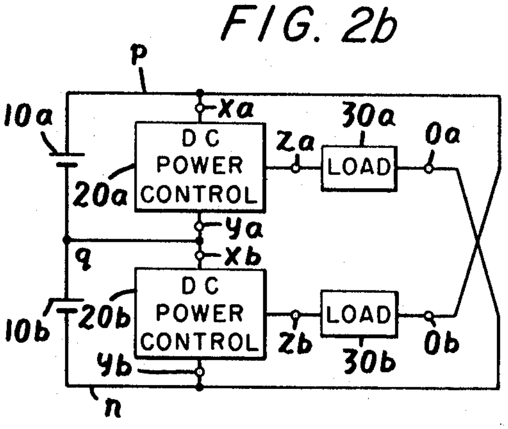
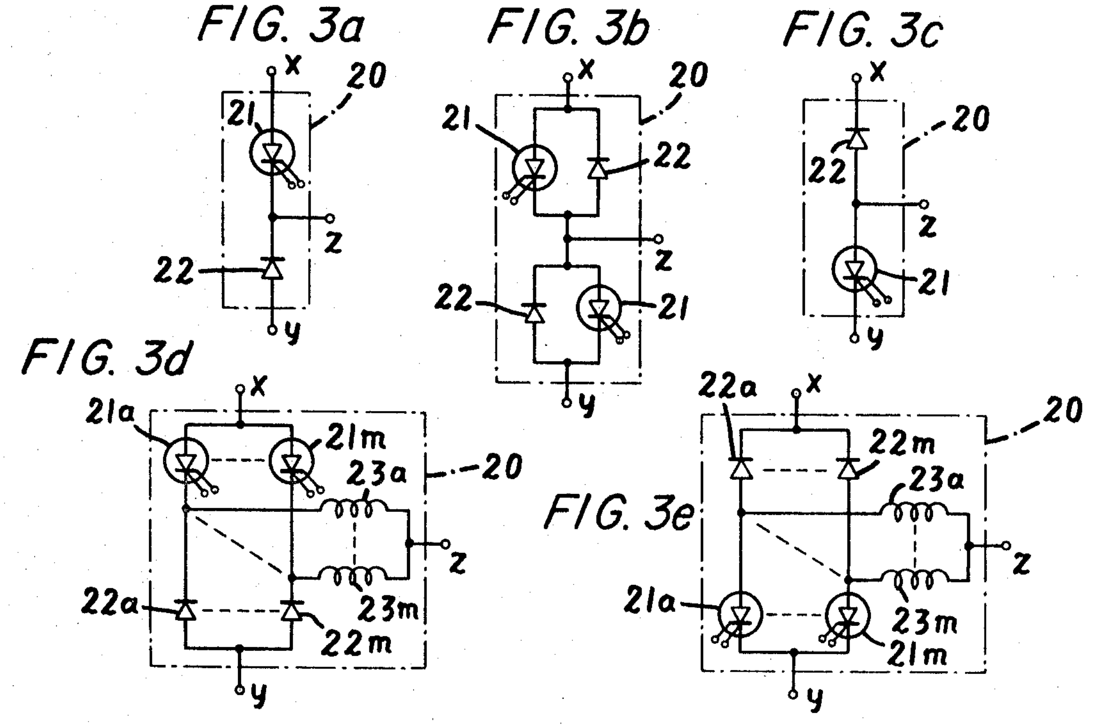
FIG. 3a, FIG. 3b, FIG. 3c, FIG. 3d, FIG. 3e

SYSTEM FOR CONTROLLING DC POWER

BACKGROUND OF THE INVENTION

This invention relates to improvements in a system for controlling DC power through the utilization of the switching or linear mode of operation.

The conventional type of DC power controlling systems referred to has comprised a power supply circuit for supplying a DC power from a source of direct current through a DC power control unit including a thyristor-type chopper to a load. The control unit has been controlled to control a power supply to the load. Also, in the field of electric motors for use in electric vehicles it has been commonly practiced to divide the associated load into two portions, and to selectively interconnect those two load portions in series or parallel circuit relationship for the purpose of expanding a voltage range within which the voltage applied to the load can vary. This measure has caused the power capability of the DC power control unit involved to depend upon the maximum DC power required for the two load portions connected in parallel to each other. For example, assuming that a current flowing through each of the load portions has a magnitude of $I_o$ with the associated source of direct current providing a voltage of $E_o$, a power capability of $2EI_o$ is required for the parallel connection as compared with the series connection for which a capability of $EI_o$ is sufficient. This increase in power capability is accompanied by the necessity of using the associated input and output filters capable of handling a power of $2EI_o$ provided that the DC power control unit involved is put in the switching mode of operation. Therefore the entire system should handle a power of $2EI_o$.

On the other hand, each of the load portions has a maximum permissible voltage applied thereto. This has frequently led to those load portions being permanently, connected in parallel circuit relationship for the purpose of eliminating the troublesome switching of connection. In the latter event, the load portions might not satisfy the requirement for a minimum permissible voltage. Particularly, in the field of electric motors for use in electric vehicles, it has been disadvantageous that the associated chopper-type control including a thyristor or thyristors has been required to include troublesome aiding means such as the partial insertion of a series resistance thereinto in the minimum output state. This is because such a control has imposed thereon severe restrictions as to the inductive disturbance, communication interference, mechanical resonance etc.

SUMMARY OF THE INVENTION

Accordingly, it is an object of the invention to decrease the number of elements included in a DC power control unit for use in a system for controlling DC power while decreasing the power capability of the control unit.

It is another object of the invention to reduce ripple components of input current to and output current from the control system as described in the preceding paragraph.

It is still another object to decrease the power capabilities of the input and output filters for use in the control system as described in the preceding paragraph.

The invention accomplishes the above cited objects by the provision of a system for controlling DC power, comprising a source of direct current, DC power control means connected across the source, and load means connected to the DC power control means to be supplied with a controlled power by the latter, characterized in that the source includes a positive end terminal, a negative end terminal and a voltage dividing terminal at an intermediate potential, and that the DC power control means consists of a pair of DC power control units each including a pair of input terminals and an output terminal, those input terminals of one of the control units being connected to the positive end and voltage dividing terminals of the source respectively while those input terminals of the other control unit are connected to the voltage dividing and negative end terminals of the source respectively with the output terminals of the control units connected to the load means.

Preferably the load means may be divided into a pair of equal load portions each connected at one end to the output terminal of the associated control unit. The other end of each of the load portions may be connected to the junction of both the control units or to that end terminal of the source connected to the associated control units in order to put both the load portions in parallel circuit relationship with respect to the source. Alternatively the other end of each of the load portions may be connected to that end terminal of the source not connected to the associated control units in order to put both the load portions in series circuit relationship with respect to the source.

Advantageously, both the control units may perform on ON and OFF operation and be operated with a predetermined phase difference maintained therebetween.

In order to decrease ripple components of the input current to and the output current from each of the control unit, reactor means may be provided including a pair of windings inductively coupled to each other and connected to both the load portions respectively.

BRIEF DESCRIPTION OF THE DRAWINGS

The invention will become more readily apparent from the following detailed description taken in conjunction with the accompanying drawings in which:

FIGS. 1*a* and *b* are schematic circuit diagrams of a system for controlling a DC power in accordance with the principles of the prior art illustrating the series and parallel connections of loads respectively;

FIGS. 2*a* and *b* are schematic circuit diagrams of an embodiment constructed in accordance with the principles of the invention illustrating the series and parallel connections of loads respectively;

FIGS. 3*a* through *e* and FIGS. 4*a* through *f* are schematic wiring diagrams of different DC power control units which may be used with the invention;

DESCRIPTION OF THE PREFERRED EMBODIMENTS

Figures 4A, 4B, 4C, 4D, 4E, 4F:
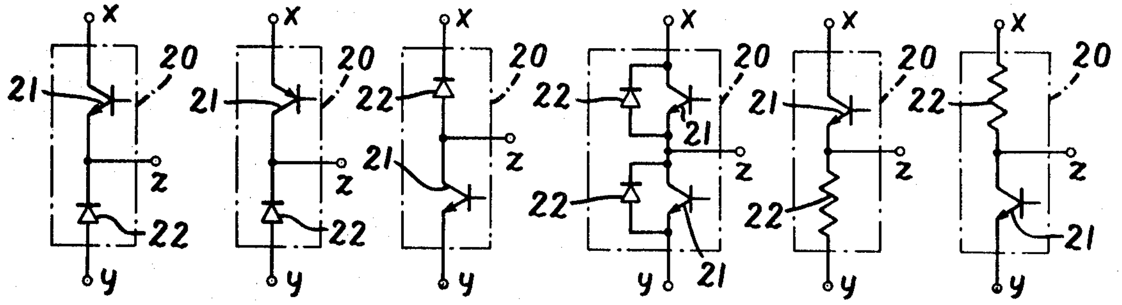

Referring now to the drawings and FIG. 1*a* in particular, there is illustrated a system for controlling DC power in accordance with the principles of the prior art. The arrangement illustrated comprises a source of direct current 10 connected across a DC power control unit 20 through a pair of input terminals *x* and *y* and a load 30 connected to the control unit 20 through an output terminal *z* and also to the junction of the terminal *y* and one side of the source 10 through a terminal *o*. In the example illustrated, the terminals *x* and *y* are at positive and negative potentials respectively. The control unit 20 functions to control the potential at the output terminal *z* in accordance with the potential difference between the input terminals $x$ and $y$ and functions in its linear or switching mode of operation.

A well know, electric vehicles include, in many cases, the group of electric motors divisible into two portions such as a first and a second load portion 30$a$ and $b$ respectively as shown in FIG. 1$a$. In FIG. 1$a$ the first and second load portions 30$a$ and $b$ are connected in series circuit relationship with each other in order to control a voltage applied to either of both load portions to a magnitude of from zero to one-half the voltage across the source 10 which may have a magnitude of E. On the other hand, FIG. 1$b$ wherein like reference numerals and characters designate the components identical to those shown in FIG. 1$a$, illustrates the parallel connection of the first and second load portions 30$a$ and $b$ for the purpose of controlling a voltage applied to either of both the load portions to a magnitude of from zero to the full voltage across the source 10.

The switching of the load portions from the series to the parallel connection and vice versa is preferable in the sense that a voltage range for either of the load portions is expanded. However the conventional control systems such as shown in FIG. 1 has had the disadvantages and objections as previously described.

The present invention contemplates to eliminate the above-mentioned disadvantages of and objections to the prior art-type control systems by the provision of a novel system for controlling DC power, including a DC power control serially divided into two units, a voltage dividing network operatively associated with a source of direct current and a load divided into two sections with those components connected to each other in a unique manner. Further, with the serially connected DC power control units put in the switching mode of operation, the switching cycles of both units may be effected with a predetermined phase difference for the purpose of decreasing the input and output ripples or the power capabilities of the associated input and output filters. In the latter event, the DC power control units may be provided at the outputs with magnetical coupling means in order to more effectively decrease the output ripple.

Referring now to FIG. 2 wherein like reference numerals and characters designate the components identical to those shown in FIG. 1, there is illustrated a control system constructed in accordance with the principles of the present. FIG. 2$a$ shows the control system including a pair of loads connected in parallel circuit relationship with respect to a source of direct current involved while FIG. 2$b$ shows the same system including the loads connected in series circuit relationship with respect to the source. Therefore FIG. 2$a$ will now be described in detail.

In FIG. 2$a$ a source of direct current generally designated by the reference number 10 includes a pair of serially connected source portions 10$a$ and $b$ of direct current with the same polarity and has a positive pole connected to an input terminal $x_a$ to a first DC power control unit 20$a$ and a negative pole connected to an input terminal $y_b$ to a second DC power control unit 20$b$. The junction $q$ of both the source portions 10$a$ and $b$ is connected to the junction of the other input terminals $y_a$ and $x_a$ respectively of the first and second control units 20$a$ and $b$. This means that the source 10 includes voltage dividing means.

Each of the DC power control units may preferably include at least two input terminals $x$ and $y$ and at least one output terminal $z$. Only for the purpose if illustration, the control units 20$a$ and $b$ each are shown in FIG. 2$a$ as including two input terminals $x_a$ and $y_a$ or $x_b$ and $y_b$ and a single-output terminal $z_a$ or $z_b$. The DC power control unit 20 serves to control the potential at the output terminal $z$ in accordance with the instantaneous or average magnitude of the voltage applied across the input terminals $x$ and $y$.

The output terminals $z_a$ and $z_b$ respectively having the respective output terminals $o_a$ and $o_b$. Then the terminals $o_a$ and $o$b are connected to the positive and negative poles of the source 10 through conductors P and N respectively. Thus the loads 30$a$ and $b$ are connected in parallel circuit relationship with respect to the source 10.

The arrangement of FIG. 2$b$ is substantially identical to that shown in FIG. 2$a$ except for the output terminals $o_a$ and $o_b$ of the loads 30$a$ and $b$ being switched over and connected to the negative and positive poles of the source 10. In other words, the loads 30$a$ and $b$ are connected in series circuit relationship with respect to the source 10. A well-known switching device is employed to perform this and the subsequently mentioned switching operations, as discussed hereinafter with reference to FIG. 12.

The DC power control unit as above-described may preferably take any one of the forms as shown in FIGS. 3 and 4.

FIG. 3 shows different types of DC power control units 20 including the thyristor acting as a chopper adapted to be put in the switching mode of operation. In FIG. 3 a thyristor 21 forming a controllable arm is serially connected to a semiconductor diode 22 forming an uncontrolled arm between a pair of input terminals $x$ and $y$ with the junction of the thyristor and diode connected to an output terminal $z$. The unit 20 as shown in FIG. 3$a$ serves to control a current flowing from the output terminal $z$ into the associated load (not shown in FIG. 2$a$).

In FIG. 3$b$ a parallel combination of a thyristor 21 and a semiconductor diode 22, opposite in polarity to each other, is serially connected to another parallel combination of the same construction between a pair of input terminals $x$ and $y$. The junction of both combinations is similarly connected to an output terminal $z$. The unit 20 as shown in FIG. 3$b$ can control a current flowing through the output terminal $z$ in either of the opposite directions.

The unit 20 shown in FIG. 3 $c$ is identical to that shown in FIG. 3$a$ excepting that the thyristor 21 and the semiconductor diode 22 are reversed in position relative to the input terminals from those illustrated in FIG. 2$a$. The unit serves to control a current flowing into the output terminal $z$.

FIG. 3$d$ shows a polyphase control unit 20 disposed between a pair of input terminals $x$ and $y$ and includes a plurality of series combinations 21$a$–22$a$, ....., 21$m$–22$m$ identical in construction to the unit 20 of FIG. 3$a$ and connected in parallel to one another, one for each phase. Each junction of the thyristor 21 and the diode 22 is connected to a common output terminal $z$ through an individual inductance 23$a$ 23$m$. That unit 20 serves to control a current flowing through the output terminal in either of the opposite directions.

The unit arrangement shown in FIG. 3$e$ is identical to that illustrated in FIG. 3$d$ excepting that the thyristors and diodes are reversed in position relative to the input terminals from those shown in FIG. 3$d$. The unit of FIG. 3$e$ is operated in the same manner as the unit of FIG. 3$d$. FIG. 4 shows different DC power control units including the transistor and capable of being put in either of the switching and linear modes of operation.

The unit 20 as shown in FIG. 4$a$ is only different from that illustrated in FIG. 3$a$ in that an NPN type transistor 21 is substituted for the thyristor 21 previously described. In FIG. 4$b$ a PNP-type transistor 21 is substituted for the NPN-type transistor 21 shown in FIG. 4$a$. FIG. 4$c$ corresponds to FIG. 3$c$ but shows shows NPN-type transistor 21. FIG. 4$d$ corresponds to FIG. 3$b$ but shows transistors 21 in place of the above-mentioned thyristors. FIGS. 4$e$ and $f$ correspond to FIGS. 4$a$ and $c$ respectively and illustrate the fixed resistance 22 replacing the semiconductor diode.

Referring back to FIG. 2$a$, each of the loads 30$a$ or $b$ can be controllably applied with a voltage equal to at most the full voltage across the associated source portion 10$a$ or $b$ respectively as will be readily understood from the previous description made in conjunction with FIG. 1$a$. For example, if it is assumed that the first source portion 10$a$ is equal in voltage to the second source portion 10$b$ with the sum of both the voltages having a magnitude of E, then the loads 30$a$ and $b$ each has controllably applied thereacross a voltage ranging from zero to E/2.

In FIG. 2a, it will be readily understood that if desired, both the output terminals 0a and 0b may be connected to the junction of the input terminals ya and xb as shown at dash line.

As previously described, FIG. 2b illustrates the pair of loads 30a and b connected in series circuit relationship with respect to the source 10 or the series combination of the source portions 10a and b. Thus the first load 30a has continuously applied thereto a base voltage equal to the voltage across the second source portion 10b while the second load 30b similarly has continuously applied thereto a base voltage equal to the voltage across the first source portion 10a. Therefore the first and second loads 30a and b each have controllably applied thereto a voltage ranging from zero to the full voltage across the associated source portion 10a or b respectively and superposed on the individual base voltage. For example, under the assumed condition as above described, the voltage supplied to the loads 30a and b can be controlled within a voltage range of from E/2 to E.

If means are provided for switching the control system from the parallel to series connection or the connection as shown in FIG. 2a to the connection as shown in FIG. 2b and vice versa, then a voltage applied across each of the loads 30a and b can be controlled over the full range of the sum of voltages across the first and second source portions 10a and b.

From the foregoing it will be appreciated that with the source voltage E divided into two equal portions and with the loads equal to each other, each of the DC power control units is required only to have voltage capabilities in both of E/2 and a current capability equal to a load current $I_o$ for each load while the control system is possible to handle a power of $EI_o$ because the two control units are used. In other words, the same control unit is sufficient to be selectively coupled to the parallel and series connections as shown in FIGS. 1a and b while the power capability of the unit decreases to one-half that of the conventional controls provided that the source voltage and the load current remain unchanged.

Figure 5A:
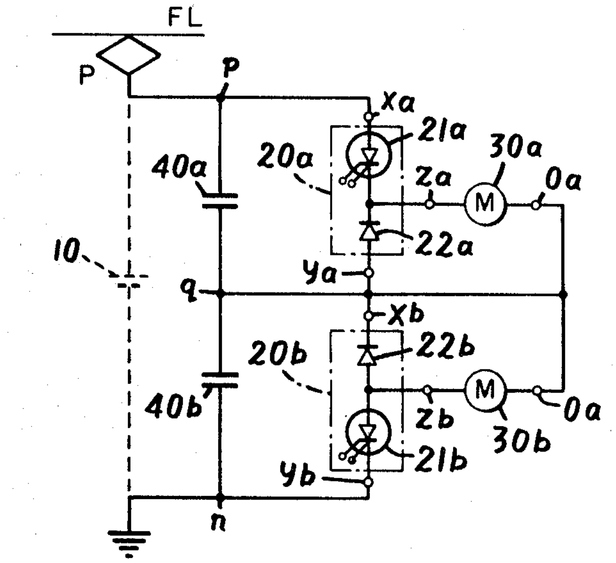
FIGS. 5*a* and *b* are schematic circuit diagrams of a chopper-type system for controlling a DC power in accordance with the principles of the invention illustrating the series and parallel connections of loads respectively.

Referring now to FIG. 5, there is illustrated another form of the invention applied to the control of electric motors equipped on an electric vehicle wherein a chopper is used as the DC power control unit 20 as previously described in conjunction with FIG. 2. In FIG. 5a a feeder line FL applies a voltage to the system through a panthograph P. It will be readily appreciated that the voltage applied by the feeder line FL is equivalent to a voltage across a source 10 of direct current as shown at dotted line in FIG. 5a. The source 10 is operatively connected across a voltage dividing network 40 consisting of a pair of serially connected capacitors 40a and b. Only for purposes of illustration, it is assumed that those capacitors are substantially equal in capacitance to each other. Each of the capacitors 40a or 40b has connected thereacross a DC power control unit 20a or b of chopper-type shown as including a series combination of a thyristor 21a or b and a semiconductor diode 22a or b similar to that shown in FIG. 3a. In other respects the arrangement is substantially identical to that shown in FIG. 2a excepting that a pair of loads 30a and b, in this example a pair of electric motors M, is directly connected to the junction of the DC power control units 20a and b and also to the junction q of the capacitors 40a and 40b. It is also seen that the motors 30a and b are connected in parallel circuit relationship with respect to the source 10.

Figure 6A:
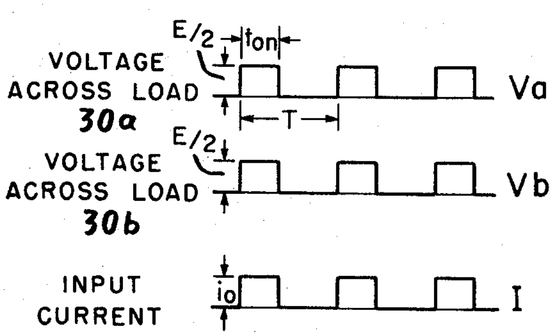
FIGS. 6*a* and *b* are graphical representations on waveforms developed at various points of the arrangements illustrated in FIGS. 5*a* and *b* respectively.

It is now assumed that the thyristors 21a and b in the control arms of both power control units 29a and b are turned ON and OFF in phase. Then waveforms as shown in FIG. 6a will be developed at various points of the system as illustrated in FIG. 5a. More specifically, if both the thyristors 21a and b are simultaneously turned ON and maintained on their ON-state for a time interval of $t_{on}$ with a system period of "T," then voltages across the loads 30a and b have a magnitude of E/2 as shown at rectangular waveforms $V_a$ and $V_b$ in FIG. 6a assuming that the source 10 provides a voltage of magnitude E. At that time, a current $i_i$ drawn from the source 10, that is, an input current, is equal to a load current $i_o$ for each load as shown at rectangular waveform I in FIG. 6a. On the other hand, when the thyristors 21a and b are in their nonconductive state, the load current circulates through the respective diodes or uncontrolled arms 22a and b. Under these circumstance, voltage across each load is substantially null and a zero current is drawn from the source as shown in FIG. 6a.

Figure 5B:
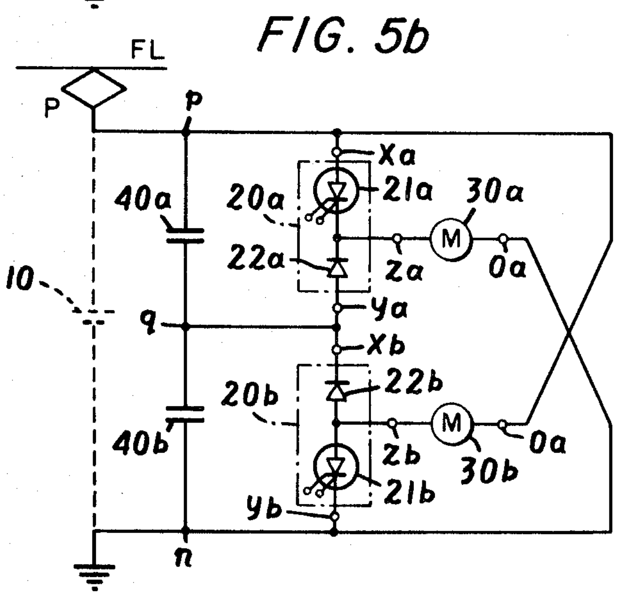
Figure 6B:
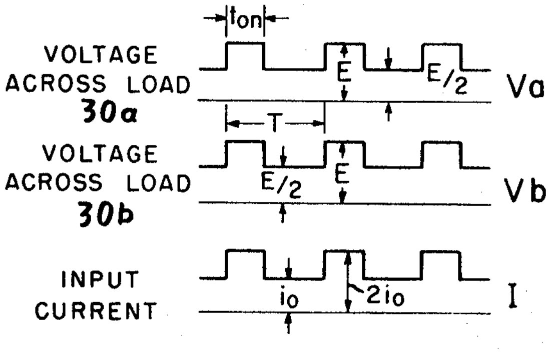

Referring now to FIG. 5b wherein there is illustrated the control system identical to that shown in FIG. 6a except that the pair of loads 30a and b are connected in series circuit relationship with respect to the source 10 of direct current the simultaneous conduction of the thyristors 21a and b cause each of the loads 30a or b to be applied with the full voltage across the source 10 (see waveforms $V_a$ and $V_b$ shown in FIG. 6b). Then a current $i_i$ drawn from the source 10 is equal to the sum of load currents $i_o$ for the loads or to $2i_o$, as shown at waveform I in FIG. 6b.

On the other hand, with both the thyristors 21a and b simultaneously put in their nonconductive state, a first closed loop is formed including the first capacitor 40a, the second load 30b and the second uncontrolled arm or second diode 22b while at the same time a second closed loop is formed including the second capacitor 40 b the first uncontrolled arm or first diode 22a and the first load 30 a. This permits each load to be applied with a voltage equal to one-half the voltage E across the source 10 and also a current $i_i$ drawn from the source to be equal to the load current $i_o$ for each load as shown in FIG. 6b.

From the foregoing it will be appreciated that in the arrangement as illustrated in FIG. 5a, the voltage across each load is pulse-duration modulated between zero and E/2. That is, the voltage has amplitudes of zero and E/2 alternating with each other. Similarly the input direct current $i_i$ is pulse-duration modulated between zero and $i_o$. However, in the arrangement as illustrated in FIG. 5b, the voltage across each load is pulse-duration modulated between E/2 and E and the input current $i_i$ is pulse-duration modulated between $i_o$ and $2i_o$.

It is now assumed that in the arrangement of FIG. 5, the pair of thyristors 21a and b are alternately turned ON and OFF while a phase difference corresponding to one-half the system period of T is held therebetween. Under the assumed condition, the system has a first mode of operation in which both the thyristors are simultaneously in their nonconductive state, a second mode of operation in which only either one of the thyristors in conducting and a third mode of operation in which the thyristors are simultaneously in their conductive state. It is noted that the operation of the system as above-described in conjunction with FIG. 6 does not include the second mode of operation just described.

It is also assumed that a time interval $t_{on}$ for which the thyristor is put in its conductive state is less than one-half the system period T or $T_{on}/TT<½$. Under the assumed conditions, the arrangement as shown in FIG. 5a performs the first modes of operation alternating the second modes of operation as shown at waveforms $V_a$, $V_b$ in FIG. 7a. More specifically, the second mode of operation is repeated at pulse recurrence intervals equal to one-half the system period T or the switching period for the thyristors. In the second mode of operation, the voltage with the amplitude of E/2 is applied only to either one of the loads 30a or b at a time and simultaneously the corresponding one of the load currents $i_o$ is flowing through the intermediate point q for the source 10. Due the shunting effect of the capacitors 40a and b, a current $i_i$ drawn from the source 10 is equal to one-half the load current or $i_o/2$ (see waveform I shown in FIG. 7a).

Figures 7A, 7B, 7C, 7D:
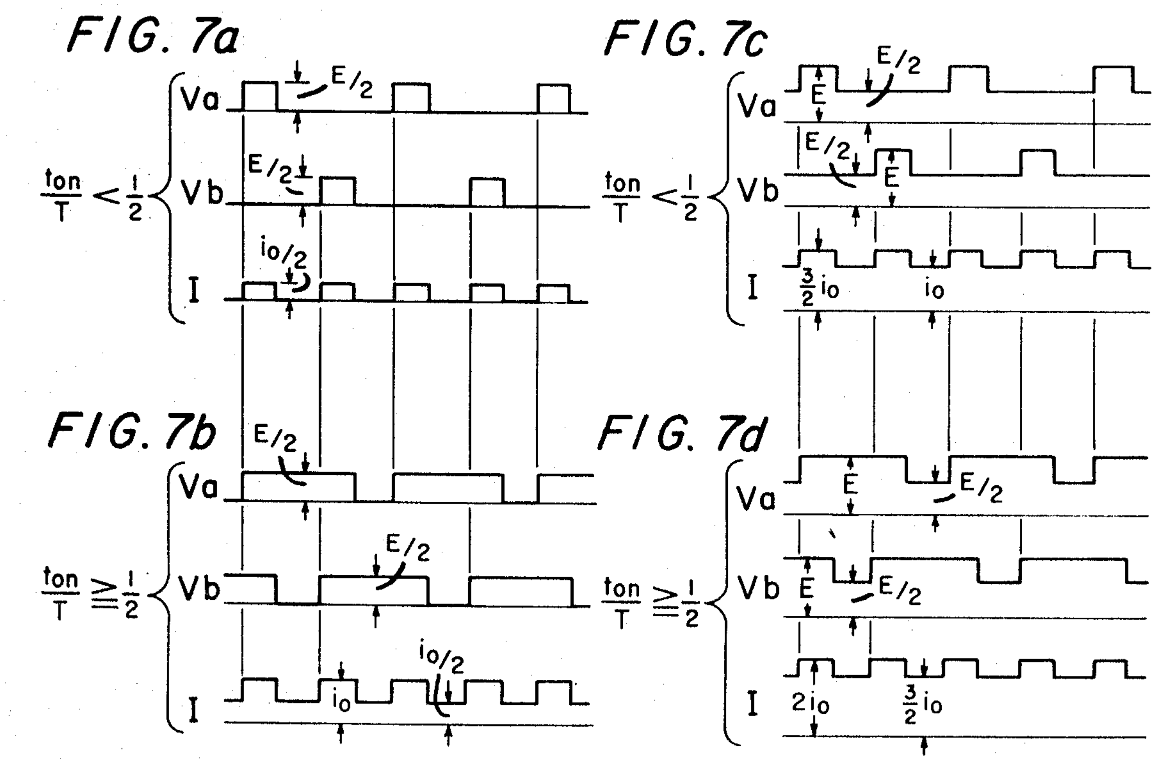
FIGS. 7*a* through *d* are views similar to FIGS. 6*a* and *b* but illustrating different modes of operation from that shown in FIGS. 6*a* and *b*.

On the other hand, the arrangement of FIG. 5b under the assumed conditions as above described has waveforms developed across various points as shown in FIG. 7c. As in FIG. 6b, that load connected to the particular thyristor now conducting has applied thereacross the full voltage E provided by the source while the other load has a voltage with an amplitude of E/2 applied thereacross through the associated diode (see waveforms $V_a$ and $V_b$ shown in FIG. 7c). At that time the other load has a current fed from the intermediate point q for the source and a current of $i_o/2$ is drawn from the source. On the other hand, all the current drawn from the source flows through that load having applied thereacross the full voltage provided by the source. This results in the resultant input current $i_l$ from the source having an amplitude of 3/2 $i_o$. Therefore the drawn current $i_l$ has its waveform as shown on the lowermost portion in FIG. 7c.

If the conduction time $t_{on}$ as above described is equal to or greater than one-half the system period T with both the thyristors operated out of phase as above described then the arrangement of FIG. 5a has the second modes of operation alternating the third modes of operation. As shown at waveforms $V_a$ and $V_b$ in FIG. 7b, voltages of E/2 are alternately applied across the loads 30a and b while those voltages overlap each other. The corresponding current $i_l$ drawn from the source has a waveform I having amplitudes of $i_o$ and $i_o/2$ alternating each other as shown in FIG. 7b where $i_o$ represents the load current for each load.

On the other hand, the arrangement of FIG. 5b has also the second modes of operation alternating the third modes of operation and the voltages across the loads and the current $i_l$ drawn from the source have their respective waveforms $V_a$, $V_b$ and I as shown in FIG. 7d. In FIG. 7d it is noted that the drawn current $i_l$ has its amplitudes equal to 11/2 times and twice that of the load current respectively.

From the foregoing it will be appreciated the presence of a phase difference in the switching operations between two portion into which the DC power control unit is divided in series circuit relationship causes the input current to decrease in ripple as compared with the simultaneous switching operations of both the portions. Thus it exhibits the greater effects upon the induction interference and the power capabilities of the associated input and output filters.

Figure 8:
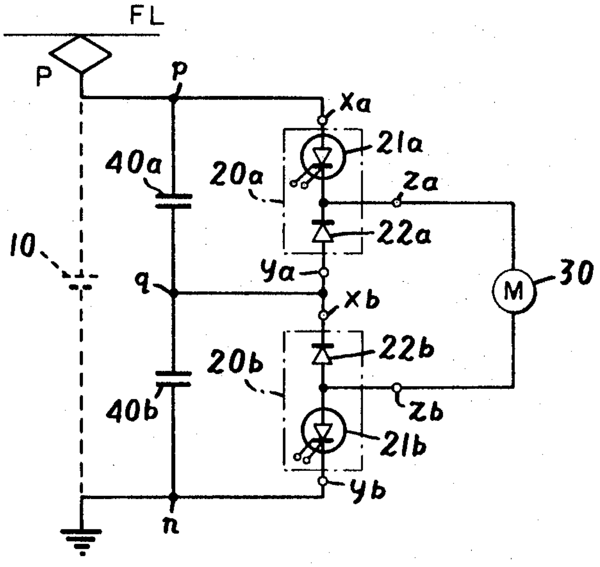
FIG. 8 is a schematic circuit diagram of another embodiment of the invention.

Referring now to FIG. 8, it is seen that an arrangement disclosed herein is substantially similar to that shown in FIG. 5aexcept for a current path between the junction of both the DC power control units and the junction of the two loads being open with a single load adapted to be controlled. The load may be considered to be a series combination of the loads 30a and b shown in FIG. 5a. Therefore like reference characters designated the components corresponding to those shown in FIG. 5a.

In FIG. 8 it will be readily understood that the simultaneous switching operation of the DC power control units 20a and b causes the system to behave in the same manner as previously described in conjunction with FIGS. 5a and 6a. However if both the control units are caused to perform the switching operation with a phase difference maintained therebetween, then a ripple component of the resulting output voltage decreases in magnitude as compared with the switching operation as previously described with reference to FIGS. 7aa and ab. which will now be discussed in conjunction with FIG. 9.

In the first mode of operation in which both the controllable arms or the thyristors 21a and b are simultaneously nonconducting, a current flowing through the load 30 circulates through both the diodes 22a and b. A voltage across the load 30 and a current drawn from the source 10 are of zero magnitude. Of course, no current flows through each of the thyristors.

In the second mode of operation in which only the first thyristor 21a is conducting a DC power is supplied to the load 30 through both a first loop traced from the first capacitor 40a through the first thyristor 21a, the load 30 and the second diode 22b and thence to the first capacitor and a second loop traced from the second capacitor 40b through the source 10, the first thyristor 21a, the load 30 and the second diode 22b and thence to the second capacitor. Thus a current $i_{21a}$ flowing through the first thyristor 21a is equal to a load current $i_o$ for the load 30 and a current $i_l$ drawn from the source 10 is equal to one-half the load current or $i_o/2$ while a voltage across $v_{30}$ across the load 30 becomes equal to one-half the voltage E across the source 10.

In the second mode of operation, the thyristor 21b alone can be conducting. In this event a DC power is supplied to the load 30 by means of both a first loop including the second capacitor 40b, the first diode 22a, the load 30 and the second thyristor 21b and a second loop including the source 10, the first capacitor 40a, the first diode 22a, the load 30 and the second thyristor 21b. Therefore a current $i_{21b}$ flowing through the second thyristor 21b is equal to the load current $i_o$ and a current $i_l$ drawn from the source 10 is equal to one-half the load current $i_o$ while a voltage $v_{30}$ across the load 30 is equal to the voltage E across the source 10. In other words, the conduction of the second thyristor alone is similar to the conduction of the first thyristor alone in the relationship between input and output voltages and between input and output currents.

In the third mode of operation in which both the thyristors are conducting, a single loop is formed including the source 10, the first thyristor 21a, the load 30 and the second thyristor 21b. Thus a current $i_l$ drawn from the source 10 is equal to a load current $i_o$ and a load voltage $v_{30}$ is equal to the voltage E across the source 10.

Figure 9A:
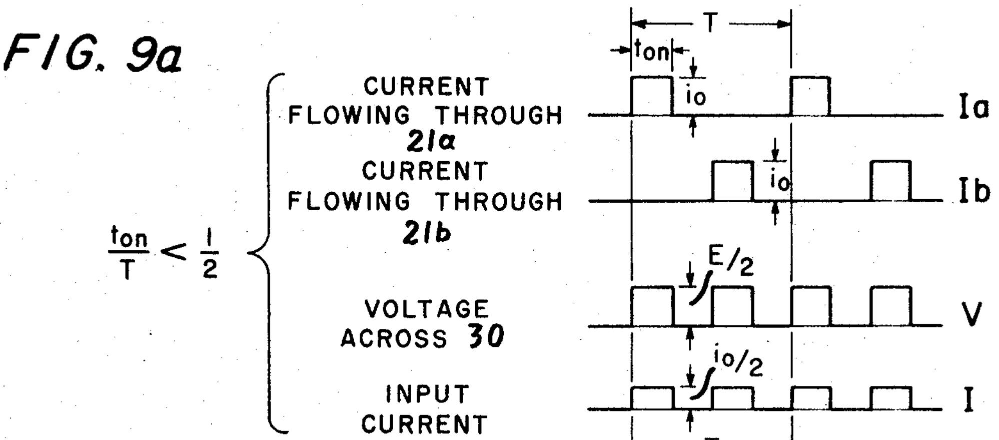
FIGS. 9*a* and *b* are graphical representations of waveforms developed at various points on the arrangement shown in FIG. 8.

It is now assumed that each thyristor is repeatedly conducting with a pulse recurrence interval or a period of T and that is conducting for a time interval of $t_{on}$. It is also assumed that a ratio of $t_{on}$ to T is less than one-half. Under the assumed condition, the first modes of operation alternate the second modes of operation and the currents $i_{21a}$ and $i_{21b}$ flowing through the conducting thyristors 21a and b, the load voltage $v_{30}$ and the input current have the respective waveforms $I_a$, $I_b$, V and I as shown in FIGS. 9a.

Figure 9B:
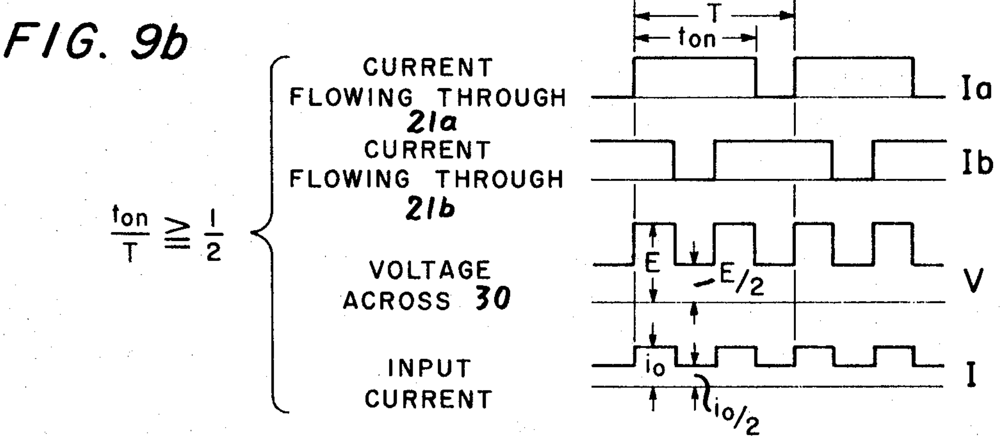

If the ratio of $t_{on}$ to T is greater than or equal to one-half, the second modes of operation alternate the third modes of operation and waveforms $I_a$, $I_b$, V and I as shown in FIG. 9b are developed on the associated components.

In order to estimate the effect provided by the arrangement of FIG. 8, one half the load voltage $v_{30}$ as shown in FIG. 9 can be compared with the associated load voltage $v_a$ or $v_b$ as shown in FIG. 7aa or ab. For example, as compared with the waveforms as shown in FIG. 7ab, the output or load voltage $v_{30}$ as shown in FIG. 9b has the ripple component halved in amplitude and doubled in ripple period. On the other hand, the current drawn from the source has the ripple component remaining unchanged between the arrangements shown in FIGS. 5a and b. That is, the ripple component has an amplitude equal to one half the amplitude of the load current and a period equal to one half the system period T.

It will be readily seen that a pair of serially connected blocks 20a and 20b as shown in FIG. 8 forms a two-phase chopper divided in series circuit relationship into two portion. By comparing that two-phase series chopper with the conventional type of two-phase chopper divided in parallel circuit relationship such as shown in FIG. 3d or e, it will be understood that in the arrangement of FIG. 8, the pair of thyristor and diode combinations may be of the two-phase series type illustrated for 15,000 volts and of the two-phase parallel type for 600 volts. Therefore the arrangement as shown in FIG. 8 can be readily and economically used with both 600 and 1,500 volts of the source voltage by switching the series to parallel connection and vice versa.

Figure 10A:
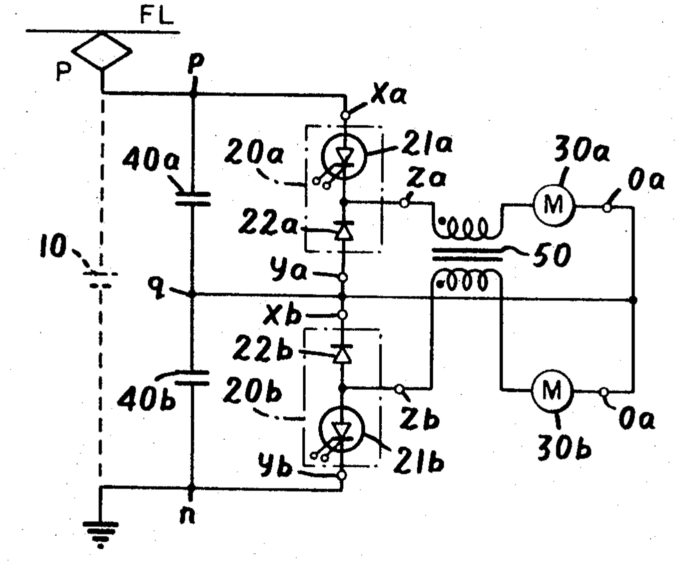
FIGS. 10*a* and *b* are schematic circuit diagrams of still another embodiment of the invention illustrating the series and parallel connections of loads respectively.
Figure 10B:
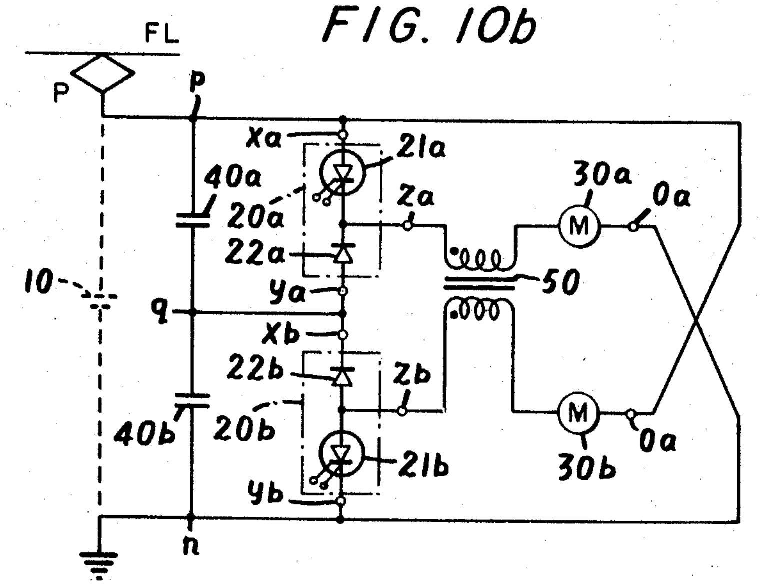

FIG. 10 illustrates another form of the invention similar to that shown in FIG. 5 except for a reactor 50 including a first and a second winding inductively coupled to each other and each connected between the junction of one thyristor and a diode directly connected thereto and the associated load. Therefore like reference characters designate the components identical to those shown in FIG. 5 Also the dot convention is used to indicate the polarity of instantaneous voltage across the winding of the reactor. As in FIG. 5, FIG. 10a shows a pair of loads 30a and b connected in parallel circuit relationship with respect to the source 10 of direct current while FIG. 10b shows both loads connected in series circuit relationship with respect to the source 10.

The operation of the arrangement as shown in FIG. 10 will now be described in conjunction with FIG. 11.

When the arrangement of FIG. 10*a* is put in the first mode of operation in which both the thyristors 21*a* and *b* are nonconducting a load current flows through the first load 30*a*, the second load 30*b*, the second winding of the reactor 50, the second diode 22*b*, the first diode 22*a*, and the first reactor winding and thence to the first load 30*a* resulting in no voltage being induced across the reactor 50. Therefore, both an input current $i_i$ and a voltage $v_{30a}$ or $v_{30b}$ across each load are null.

In the second mode of the operation in which only the thyristor 21*a* is conducting, the reactor 50 is operated to form a loop including the first capacitor 40*a* or the combination of the second capacitor 40*b* and the source 10, the first thyristor 21*a* and the first winding of the reactor 5 and the first load 30*a* and another loop including the second diode 22*b*, the second load 30*b* and the second reactor winding. That is, the second load 30*b* is serially coupled to the first load 30*a* through the reactor 50. This causes a voltage $v_{30}$ applied across one load to be equal to one half the source voltage E. Also an input current $i_i$ provided by the source 10 is equal to one-half a load current $i_o$ by means of the shunting supply by the capacitors 40*a* and *b*. This is true in the case of the second mode of operation in which only the second thyristor 21*b* is conducting.

In the third mode of operation in which the first and second thyristors 21*a* and *b* are conducting, a loop is formed including the source 10, the first thyristor 21*a* the first winding of the reactor 50, the first load 30*a*, the second load 30*b*, the second reactor winding and the second thyristor 21*b* with the result that both the windings of the reactor 50 are serially connected to each other with such a polarity that the voltages across the windings oppose or offset each other. This leads to no voltage being induced across the reactor 50. Under these circumstances, a voltage $v_{30}$ applied across one load is equal to one-half the source voltage E and an input current $i_i$ supplied by the source is equal to a load current $i_o$.

If a ratio of $t_{on}$ to T is less than one-half where $t_{on}$ and T have the same meanings as previously defined then the first modes of operation alternate the second modes of operation. Currents $i_{21a}$, $i_{21b}$, $I_{22a}$ and $i_{22b}$ flowing respectively through the first and second thyristors 21*a* and *b* and the first and second diodes 22*a* and *b* are equal to the load current $i_o$ and an input current $i_i$ provided by the source is equal to one-half the load current $i_o$ while a voltage $v_{30a}$ or $v_{30b}$ across each load is equal to a quarter the source voltage E as shown at waveforms $I_a$, $I_b$, $I'_a$, $I'_b$, V and I.

Figures 11A, 11B, 11C, 11D:
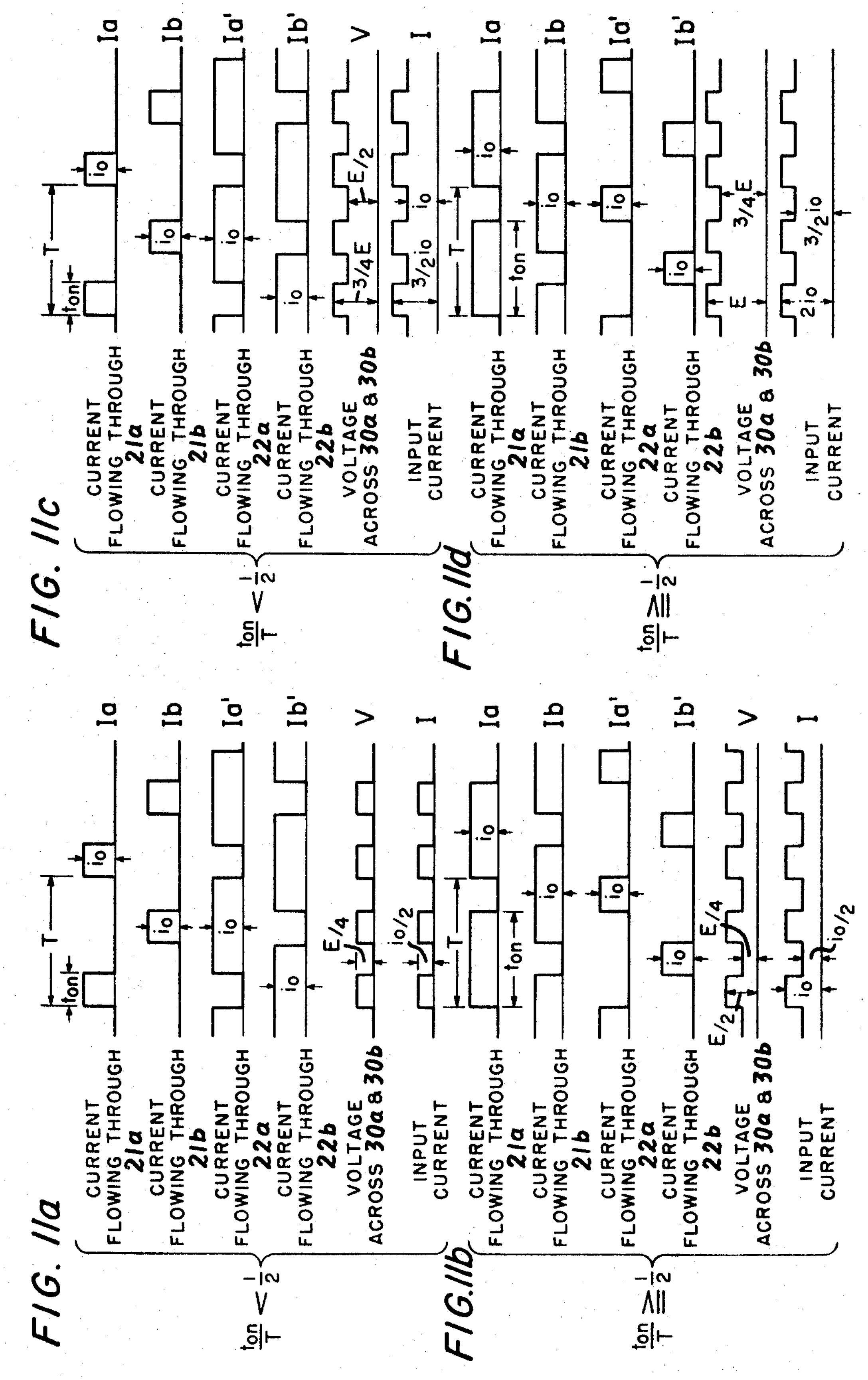
FIGS. 11*a* through 11*d* are graphical representations on waveforms developed at various points of the arrangements illustrated in FIGS. 10*a* and *b* respectively.

With the ratio of $t_{on}$ to T greater than or equal to one-half, the second modes of operation alternate the third modes of operation to provide waveforms as shown in FIG. 11*b*. In FIG. 11*b* wherein there are illustrated waveforms corresponding to those shown in FIG. 11*a*, it is noted that the voltage $v_{30a}$ or $v_{30b}$ across each load has amplitudes equal to one-half and a quarter the source voltage E and the current $i_i$ drawn from the source has amplitudes equal to the load current $i_o$ and its half or $i_o/2$.

With the arrangement of FIG. 10*b* put in the first mode of operation in which the first and second thyristors 21*a* and *b* are not conducting, there are formed a first loop including the first capacitor 40*a*, the second load 30*b*, the second winding of the reactor 50, and the second diode 22*b* and a second loop including the second capacitor 40*b*, the first diode 22*a*, the first reactor winding and the first load 30*a*. If both the loads balance each other the first and second loops are actually united together into a single loop including the source 10, the second load 30*b*, the second diode 22*b*, the first diode 22*a* and the first load 30*a*. Also the windings of the reactor 50 are so poled that voltages thereacross offset each other. Therefore each load voltage $v_{30a}$ or $v_{30b}$ is equal to one-half the source voltage E and an input current $i_i$ provided by the source is equal to the load current $i_o$.

In the second mode of operation in which only the first thyristor 21*a* is conducting, there are a first loop including the source 10, the first thyristor 21*a*, the reactor 50 and the first load 30*a* and a second loop including the second capacitor 40*a* or the combination of the second capacitor 40*b* and the source 10, the second load 30*b*, the reactor 50 and the second diode 22*b*. The reactor 50 functions to a voltage with respect to the first load 30*a* as well as increasing a voltage with respect to the second load 30*b* until a voltage across one of the loads equals that across the other load. As a result, the voltage $v_{30a}$ or $v_{30b}$ across each load is equal to three-quarter the source voltage E and an input current $i_i$ provided by the source is also equal to three quarter the load current $i_o$. For the second thyristor 21*b* alone conducting in the second mode of operation, the relationship similar to that just described is held.

In the third mode of operation in which the first and second thyristors 21*a* and 21*b* are simultaneously conducting, there are formed a first loop including the components 10, 21*a*, 50 and 30*a* and a second loop including the components 10, 30*b* 50 and 21*b*. The voltage $v_{30a}$ or $v_{30b}$ across each load is equal to the source voltage E and the input current $i_i$ supplied by the source is equal to twice the load current $i_o$.

If the ratio of $t_{on}$ to T is less than one-half then the first modes of operation alternate the second modes of operation to provide waveforms as shown in FIG. 11*c*. Alternatively if the ratio of $t_{on}$ to T is greater than or equal to one-half the second modes of operation alternate the third modes of the operation to provide waveforms as shown in FIG. 11*d*. The waveforms as shown in FIG. 11*c* or 11*d* are corresponding to those illustrated in FIG. 11*a* or *b*. in FIG. 11*c*, the load voltage $v_{30a}$ or $v_{30b}$ has amplitudes equal to three-fourths and one-half the source voltage E respectively and an input current $i_i$ provided by the source has amplitudes equal to the load current $i_o$ and 3/2 $i_o$. In FIG. 11*d*, the load voltage $v_{30a}$ or $v_{30b}$ has amplitudes equal to the source voltage E and 3/4 E and the input current $i_i$ has amplitudes equal to twice the load current $i_o$ and 3/2 $i_o$.

From the foregoing it will be appreciated that the arrangement of FIG. 10 with the coupling reactor exhibits the effect that input and output ripple further decrease as compared with the arrangement of FIG. 5. In other words, the input and output filters can additionally decrease in power capability.

Figure 12A:
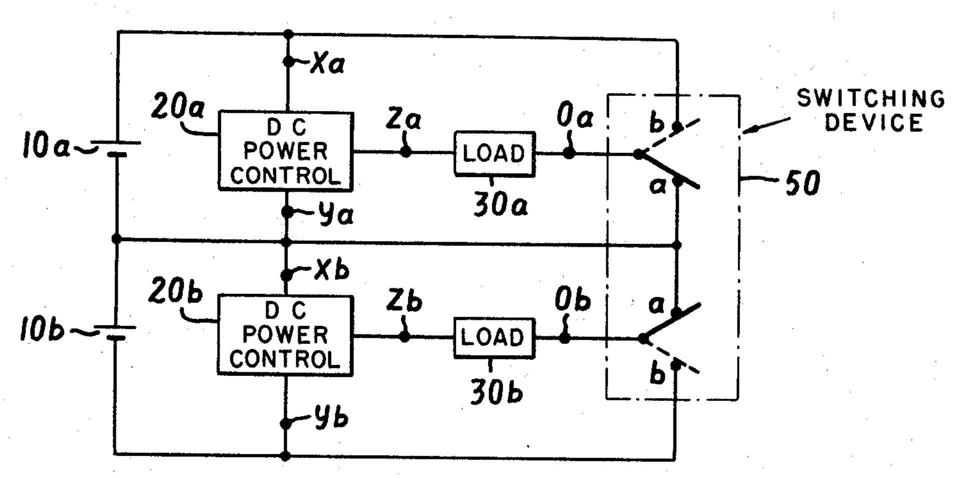
FIGS. 12*a* and 12*b* are schematic circuit diagrams showing types of switching arrangements which may be employed in practicing the present invention.

Figure 12*a* schematically portrays one tape of switching device 50 which may be used in practicing the present invention. The switching device has movable contact arms alternately engageable with stationary contacts *a* or *b*. When the switching device 50 is in the position shown in FIG. 12*a*, the movable contact arms are in engagement with the stationary contacts *a* and such a connection is equivalent to the arrangement shown in FIG. 5*a*. When the movable contact arms are engaged with the stationary contacts *b*, the arrangement shown in FIG. 2*a* is obtained.

Figure 12B:
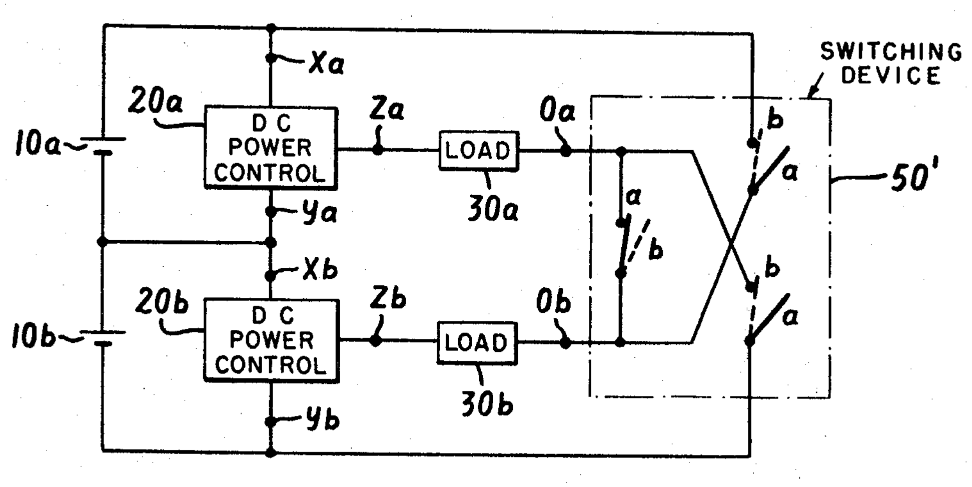

In a similar manner, if the switching device shown in FIG. 12*b* has its movable contact arms in engagement with the stationary contacts *a*, a connection similar to that shown in FIG. 8 is obtained whereupon the loads 30*a* and 30*b* are serially connected into a single load. Alternatively, when the movable arms are in engagement with the stationary contacts *b*, the system is connected in the manner shown in either FIGS. 2*b* or 5*b*. Other well-known switching devices may also be employed to selectively switch the load output terminal in accordance with the principles of the present invention.

While the invention has been described in terms of the thyristor including in the DC power control unit it is to be understood that the same is equally applicable to DC power control units including the transistor such as shown in FIG. 4.

I claim:

1. A DC power control system comprising: a source of direct current having a positive end terminal, a negative end terminal, and a voltage dividing terminal disposed between said end terminals and having a potential intermediate that of said end terminals; first DC power control means connected across said positive end terminal and said voltage dividing terminal selectively operable in an ON-OFF mode for providing a first controlled power output; second DC power control means connected across said negative end terminal and said voltage dividing terminal selectively operable in an ON-OFF mode for providing a second controlled power output; a pair of load devices each connected at one end to one of said DC power control means to receive therefrom the respective controlled power output; and means for alternatively connecting the other end of each load device to different ones of said terminals to selectively vary the power capability of said first and second DC power control means.

2. A control system according to claim 1; wherein said first and second DC power control means include means for alternately operating same in their ON-OFF mode with a predetermined phase difference maintained therebetween.

3. A control system according to claim 1; including reactor means magnetically coupling together the outputs from said first and second DC power control means.

* * * * *